United States Patent
Lau et al.

(10) Patent No.: US 10,521,728 B2
(45) Date of Patent: Dec. 31, 2019

(54) SCHEMA AND METHOD FOR DECEPTION DETECTION

(71) Applicant: BAE SYSTEMS INFORMATION AND ELECTRONIC SYSTEMS INTEGRATION INC., Nashua, NH (US)

(72) Inventors: Troy M Lau, Stoneham, MA (US); Scott A Kuzdeba, Framingham, MA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 831 days.

(21) Appl. No.: 15/089,913

(22) Filed: Apr. 4, 2016

(65) Prior Publication Data
US 2017/0098166 A1   Apr. 6, 2017

Related U.S. Application Data

(60) Provisional application No. 62/143,440, filed on Apr. 6, 2015.

(51) Int. Cl.
*G06N 5/04* (2006.01)
*G06N 7/00* (2006.01)
*G06N 20/00* (2019.01)

(52) U.S. Cl.
CPC ............ *G06N 5/041* (2013.01); *G06N 7/005* (2013.01); *G06N 20/00* (2019.01)

(58) Field of Classification Search
CPC ......... G06N 5/041; G06N 7/005; G06N 20/00
See application file for complete search history.

(56) References Cited

U.S. PATENT DOCUMENTS 5,876,334 A * 3/1999 Levy ................. A61B 5/16
                                                  600/300
10,368,792 B2 * 8/2019 Keshava .............. A61B 5/164
(Continued)

OTHER PUBLICATIONS

Teredesai, Ankur & Govindaraju, Venu, "GP-based Secondary Classifiers", 2005, Elsevier, Pattern Recognition, pp. 505-512. (Year: 2005).*

(Continued)

*Primary Examiner* — Scott A. Waldron
(74) *Attorney, Agent, or Firm* — Maine Cernota & Rardin

(57) ABSTRACT

A method for predicting subject trustworthiness includes using at least one classifier to predict truthfulness of subject responses to prompts during a local or remote interview, based on subject responses and response times, as well as interviewer impressions and response times, and, in embodiments, also biometric measurements of the interviewer. Data from the subject interview is normalized and analyzed relative to an experience database previously created using data obtained from test subjects. Classifier prediction algorithms incorporate assumptions that subject response times are indicators of truthfulness, that subjects will tend to be consistently truthful or deceitful, and that conscious and subconscious impressions of the interviewer are predictive of subject trustworthiness. Data regarding interviewer impressions can be derived from interviewer response times, interviewer questionnaire answers, and/or interviewer biometric data. Appropriate actions based on trustworthiness predictions can include denial of security clearance or further investigation relevant to the subject.

22 Claims, 6 Drawing Sheets

(56) References Cited

U.S. PATENT DOCUMENTS

| | | | | |
|---|---|---|---|---|
| 2012/0116186 A1* | 5/2012 | Shrivastav | ........... | A61B 5/0507 600/301 |
| 2013/0266925 A1* | 10/2013 | Nunamaker, Jr. | ...... | G06N 20/00 434/362 |
| 2017/0119295 A1* | 5/2017 | Twyman | ................ | A61B 3/112 |

OTHER PUBLICATIONS

Benyacoub, Badreddine et al., "Learning Decision by Hidden Markov Model", Apr. 2014, pp. 2238-2247. (Year: 2014).*

Sharma, Chetan, "Big Data Analytics Using Neural Networks", May 2014, 100 pages. (Year: 2014).*

Fosler-Lussier, Eric, "Markov Models and Hidden Markov Models: A Brief Tutorial", International Computer Science Institute, TR-98-041, 9 pages. (Year: 1998).*

Lepkowski, James M., et al., "Event History Analysis of Interviewer and Respondent Survey Behavior", Developments in Survey Methodology, 18 pages. (Year: 2000).*

Vrij, Aldert & Mann, Samantha, "Police Use of Nonverbal Behavior as Indicators of Deception", appearing in Applications of Nonverbal Communication, edited by Ronald E. Riggio & Robert S. Feldman, published by Lawrence Erlbaum Associates Inc., pp. 63-94. (Year: 2005).*

Zhou, Lina. "An empirical investigation of deception behavior in instant messaging." Professional Communication, IEEE Transactions on 48.2 (2005): 147-160.

IARPA. The checkmate protocol, 2014. https://www.innocentive.com/ar/challenge/9933465, 35 pages.

Tsechpenakis, Gabriel, et al. "HMM-based deception recognition from visual cues." Multimedia and Expo, 2005. ICME 2005. IEEE International Conference on. IEEE, 2005.

Freund, Yoav, Robert Schapire, and N. Abe. "A short introduction to boosting."Journal-Japanese Society for Artificial Intelligence 14.771-780 (1999): 1612.

Walczyk, Jeffrey J., et al. "Cognitive mechanisms underlying lying to questions: Response time as a cue to deception." Applied Cognitive Psychology 17.7 (2003): 755-774.

Vendemia, Jennifer MC, Robert F. Buzan, and Eric P. Green. "Practice effects, workload, and reaction time in deception." The American journal of psychology(2005): 413-429.

Malik, Zaki, Ihsan Akbar, and Athman Bouguettaya. "Web services reputation assessment using a hidden markov model." Service-Oriented Computing. Springer Berlin Heidelberg, 2009. 576-591.

* cited by examiner

SCHEMA AND METHOD FOR DECEPTION DETECTION

RELATED APPLICATIONS

This application claims the benefit of U.S. Provisional Application No. 62/143,440, filed Apr. 6, 2015, which is herein incorporated by reference in its entirety for all purposes.

STATEMENT OF GOVERNMENT INTEREST

Portions of the present invention may have been made pursuant to an IARPA Reduction to Practice Challenge, and there may be certain rights to the United States Government.

FIELD

This invention relates to deception detection, and more particularly, to methods for detecting deception by a subject during an interaction with an interviewer.

BACKGROUND

Deception detection is of significant importance to both Intelligence and Law Enforcement Agencies. The standard approach for deception detection is the polygraph, an approach that has existed for 90 years. The polygraph uses a combination of heart rate, blood pressure, respiratory rate, and skin conductance to provide feedback to a human "expert." By monitoring this biometric data while asking a series of baseline yes/no questions, followed by the questions of interest (typically also framed as yes/no questions), the expert is able to make a prediction as to the subject's honesty.

However, there is significant debate over the quantitative accuracy of polygraph tests, the results of which are not admissible in court. As a result, polygraphs are often used largely as deception deterrents (as opposed to deception detectors), identifying deceivers as those who decline to be tested.

Furthermore, the requirement of placing biometric feedback sensors on an interview subject creates an artificial environment that can affect the behavior and physical state of the polygraph subject, and can cause the subject to exhibit a heightened reluctance to being interviewed and tested, even if there is no intent to deceive.

What is needed, therefore, are improved techniques for detecting deception on the part of an interview subject that do not require biometric monitoring of the subject.

SUMMARY

A method is disclosed for predicting the trustworthiness of a subject in real time in scenarios where the subject is interacting with an interviewer according to a pre-established subject evaluation "schema" that defines a standard set of prompts which are transmitted to the subject by the interviewer, and a set of corresponding responses are received from the subject. In embodiments, the "prompts" are not limited to yes/no questions, and need not even be in the form of traditional questions. It is only necessary that that interviewer provides prompts that require some sort of well-characterized response from the subject.

The disclosed method depends only on information that is naturally provided by the subject during execution of the schema, as well as data that can be obtained directly from the interviewer. As such, the method can be applied to a subject who is interacting either remotely or in person with an interviewer, without any requirement to place biometric sensors on the subject. In some embodiments biometric sensors are applied to the interviewer, as discussed in more detail below.

The present invention takes advantage of several insights that have not been fully exploited in the prior art:

a. The time required for a subject to respond to a prompt is an indicator of trustworthiness.

b. Trustworthiness tends to follow a Markov chain. In other words, a subject will tend to be consistently truthful or deceptive.

c. Both the conscious and subconscious impressions of an interviewer regarding subject trustworthiness are predictors of the trustworthiness of a subject.

d. Response times of an interviewer and (optionally) measurements by biometric sensors placed on an interviewer are indicators of the subconscious impressions of the interviewer regarding likelihood of subject trustworthiness.

Accordingly, the disclosed method includes at least three phases. In the preparatory phase, the subject evaluation schema is defined. The schema includes a plurality of pre-determined interviewer prompts designed to elicit responses from the subject that will fall within a well-characterized range of possible responses. The schema also specifies at least one classifier to be used in predicting trustworthiness, what data items or "indicators" are to be obtained, and how the classifiers should analyze the data items so as to estimate the subject's trustworthiness. If more than one classifier is to be used, then the schema further specifies how the schema predictions will be combined.

The preparation phase is followed by a training phase, during which the schema is applied to a group of test subjects for which the actual truth or falsity of the responses is known. Results from the training phase allow the classifiers to apply machine learning approaches to normalizing, comparing, and analyzing the data items.

Finally, the schema is applied during an evaluation phase to one or more evaluation subjects so as to provide predictions of their trustworthiness.

In embodiments, the data items provided to the classifiers include reaction times of both the interviewer and the subject, as well as conscious impressions regarding subject trustworthiness provided by the interviewer, possibly in the form of answers to a questionnaire. In some embodiments, biometric data obtained from the interviewer is also used together with the interviewer's reaction times as indicators of the interviewer's subconscious impressions as to the trustworthiness of the subject.

Embodiments make use of a plurality of machine learning techniques that keep track of both isolated indicators and the overall (time dependent) probabilistic state of the subject. Essential to this approach is that all sensors, if any, are placed on the interviewer, and behavioral feedback from the subject is only used if it is naturally obtainable by the interviewer.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present application describes a method for detecting deception by a subject in scenarios where the subject is interacting with an interviewer according to a pre-established "schema" whereby prompts are transmitted to the subject by the interviewer and corresponding responses are received from the subject. This can be done in real time, or evaluated based on recorded data. As used herein, the term "interview" refers to any situation that involves a first party (the "interviewer") interacting with a second party (the evaluation "subject") in situations where the veracity of the evaluation subject is an issue. Some examples include law enforcement investigations, dating services, lending and banking matters, customs, security clearances, adjudicatory proceedings such as small claims and arbitration, and the like. The term "interaction" is used herein to refer to any situation where the interviewer provides prompts to the subject that result in responses being returned by the subject. Examples include, but are not limited to, the asking of direct questions and receiving of answers, as well as moves and counter-moves that occur during the playing of an interactive game.

Figure 1A:
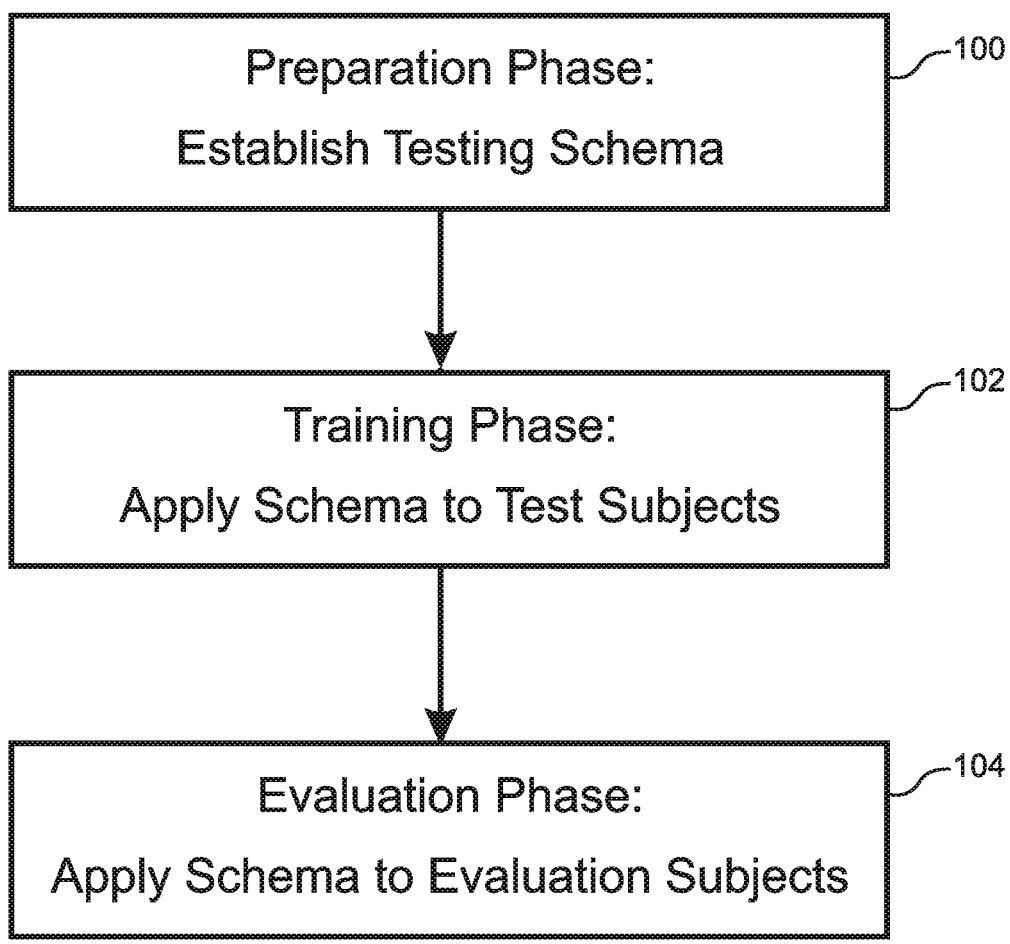
FIG. 1A is a flow diagram depicting the steps of the present invention.
Figure 1B:
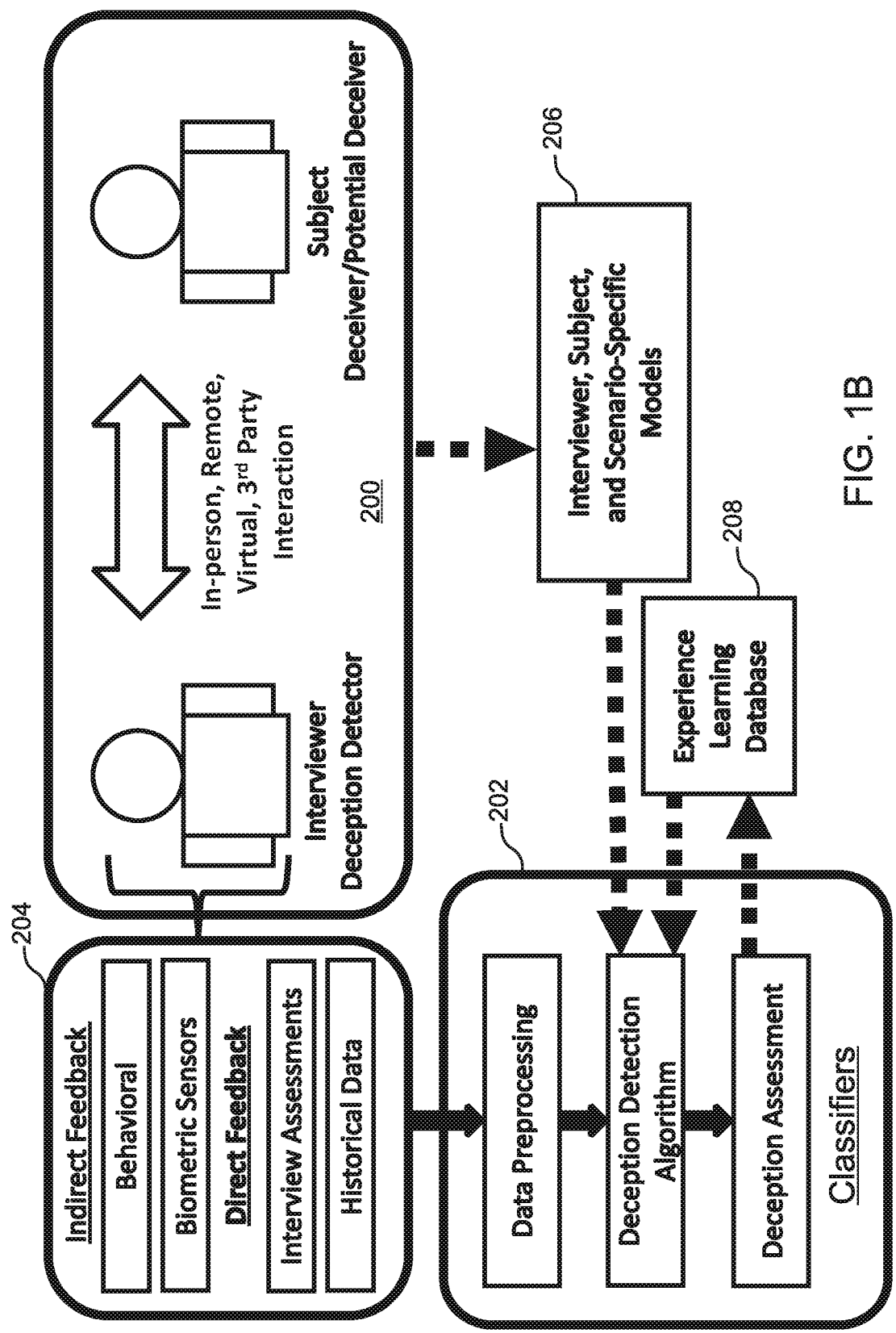
FIG. 1B is a functional diagram depicting an embodiment of the invention.

With reference to FIGS. 1A and 1B, a "schema" is determined during a preparation phase 100 that specifies the prompts to be used by an interviewer during an interaction 200 with a subject, who may be locally present or remote, and the range of likely/permitted responses from the subject. The schema will also specify the classifier or classifiers 202 to be used in evaluating the data obtained from the interaction, including what data elements 204 will be used by each classifier, and how the results will be combined if more than one classifier is used.

Typically, the data elements 204 or "indicators" used by the classifiers 202 will include both "indirect" feedback, including behavioral factors such as subject and interviewer response times, and in certain embodiments also biometric data obtained by sensors placed on the interviewer. In addition, embodiments also make use of "direct" feedback, such as interview assessments provided by the interviewer and previous indications of trustworthiness obtained from the subject based on previous responses.

During a training phase 102, the schema is applied to a group of test subjects. After some pre-processing, the at least one classifier 202 applies machine learning techniques to the test data to construct interviewer, subject, and scenario specific models 206, as well as an experience learning database 208.

Finally, the schema is applied during an evaluation phase 104 to the actual subject or subjects to be evaluated so as to obtain a trustworthiness evaluation. In embodiments, none of the actual subjects to be evaluated is included among the test subjects in the training phase. During the evaluation phase 104, the models 206 and experience learning database 208 are used by a deception detection algorithm to normalize the data items, form comparisons, and make deception assessments of the subject. In embodiments, as the interview progresses, these assessments are used to further refine the models 206 and experience learning database 208.

As noted above, embodiments make use of decision times obtained from the unprocessed data from the subject and/or the interviewer. The inventors have found that some of the strongest indicators of honesty and dishonesty arise from the actual times required for the interviewers and subjects to absorb information and react thereto, for example to read certain computer screens and interact with them. When normalized based on previous or reference observations, these times serve as some of the strongest predictors of honesty and dishonesty used by the method.

Some embodiments further integrate data streams arising from raw biometric measurements applied to the interviewer, such as ECG, EEG, EOG, and GSR, into the models.

Once the trustworthiness of the subject has been evaluated, embodiments further include the taking of an appropriate action in response to the evaluation. For example, a person being screened for a security clearance can be affirmed, denied, or made subject to further evaluation. An adjudication proceeding, such as arbitration or small claims, can leverage the evaluation in making the judgment and award. In a dating service scenario, the evaluation can be used to weed out potential applicants from the potential pool of participants or from an individual dating request. An employer can use the evaluation as a means of screening and selecting candidates. In most cases, the trustworthiness evaluation can raise a concern, such that further investigation is performed.

In further embodiments, the trustworthiness evaluation includes a trustworthiness score that is attributed to the evaluation subject based on the process, akin to a credit report number. The score can be a color code, alphanumeric rating, or any image or emoji that would be used by an evaluator to make a determination as to the individual. In embodiments, an evaluation subject that receives a low score can be given an opportunity to provide additional feedback and information in an attempt to influence the score. In some of these embodiments, the score is determined according to the quantitative output of the classifier(s), such that rather than providing a trustworthiness evaluation that is a binary decision, such as honest or dishonest, a score is provided that is a value, for example between zero and one, indicating where the subject falls on a spectrum of dishonest to honest.

Illustrative Embodiment: The Checkmate Task

The following "Checkmate" embodiment is presented to further illustrate features of the present invention by example. Pseudo-code included in the embodiment is presented in an Appendix for further illustration.

Preparatory Phase: Checkmate Schema Definition

The "interview" included in the schema of this embodiment is the so-called "Checkmate Task," which takes the form of a "game" played between a "Banker" acting as the interviewer and a "Player" acting as the subject. The Checkmate Task is described in more detail below.

The schema combines trustworthiness predictions obtained from two machine learning techniques, or "Joint Classifiers." The first, referred to herein as "Joint Classifier 1" is a Linear Discriminant Analysis (LDA)/Adaboost classifier that generates a 2-class (honest and dishonest) emission feature. The second, referred to herein as "Joint Classifier 2," is a two state (honest and dishonest) Hidden Markov Model (HMM) that uses emissions and past states (if available) to make guesses as to the state path. During interaction between the interviewer (Banker) and the subject (Player), increasingly more information is integrated and used to predict the current state, and the predictions of the two Joint Classifiers are generated, utilizing some overlapping and some non-overlapping data items. Joint Classifier 1 provides a majority of the classifications, i.e. trustworthiness predictions, while Joint Classifier 2 is used as a leveraging classifier in higher uncertainty situations.

As noted above, the present invention is based, at least in part, on a recognition and utilization of the fact that the honest/dishonest decision process follows a Markov chain. This means that if a subject is currently being honest, he or she is likely to remain honest, and vice versa. In measurements testing this approach using the Checkmate embodiment, the inventors found that there was a 67% chance that a subject would remain dishonest, and an 85% chance that a subject would remain honest. By predicting Markov sequences of states, the Checkmate embodiment is able to utilize all data from past "Rounds" within a given "Block" and "Session" of the Checkmate Task (discussed in more detail below), strengthening estimates as each Block is analyzed in greater depth.

It can be necessary to do significant data pre-processing of raw data before a classifier is able to apply a deception detection algorithm. In the Checkmate embodiment the data can sometimes be offset, so that the maze time does not correspond to 120 seconds. In other instances there may be a zero entry for the time in a certain round, and that can also shift everything. The pseudo-code function getTimeMetadata( ) presented in the Appendix illustrates how data from a specific Session, Block, and Round in the Checkmate Task can be processed so as to obtain corrected times.

The Checkmate Task

The Checkmate Task is a computer-mediated task in which participants play in a "game" as either the "Banker" (interviewer) or the "Game Player" (subject). The Banker's role is to loan money to the Game Player out of an initial endowment. During play, the Banker began his/her rounds with an endowment. The Game Player's role is to complete virtual mazes, which vary in difficulty. The mazes are three-dimensional worlds featuring small cash boxes and larger impassable obstacles. The Game Player is instructed to navigate the maze in order to collect as many cash boxes as possible. The number of cash boxes collected directly control earnings on the Banker's loan. A low number of collected boxes can result in a loss on that loan, while a high number results in additional earnings.

A single round of the Checkmate Task is detailed below. Each step of the round represents the actions of the Banker or Game Player during the game, and the title of each step corresponds to a 3-letter 'event code'.

Step 1—Game Player's Promised Maze Level (PML)

The Game Player promises the Banker that s/he will select a maze of a particular level of difficulty (Low, Moderate, or High). This promise is called the Game Player's Promised Maze Level (PML). The more difficult the maze, the greater the potential for gains on and losses from the Banker's actual loan (Step 4), depending on the Game Player's performance.

a. Low risk maze (75-150%)—The Game Player could lose up to 25% of the loan for a poor performance (leaving the Game Player with 75% of the loaned amount). However, s/he could earn up to 50% interest on the loan for a good performance (leaving the Game Player with 150% of the loaned amount).

b. Moderate risk maze (50-200%)—The Game Player could lose up to 50% of the loan for a poor performance (leaving the Game Player with 50% of the loaned amount). However, s/he could earn 100% interest on the loan for a good performance (leaving the Game Player with 200% of the loaned amount).

c. High risk maze (0-300%)—The Game Player could lose the entire loan for poor performance (leaving the Game Player with 0% of the loaned amount). However, s/he could earn 200% interest on the loan for a good performance (leaving the Game Player with 300% of the loaned amount).

Step 2—Game Player's Promised Return Selection (PRS)

The Game Player makes a promise to the Banker about how s/he will split the money at the end of the round. This promise is called the Game Player's Promised Return Selection (PRS). The Game Player selects one of the following options as his/her promise to the Banker.

a. Return initial loan and ALL gains to the Banker.
b. Return initial loan and 50% of the gains to the Banker
c. Return 50% of the money available at the end of the round to the Banker.
d. Return an amount not listed here to the Banker
e. I will decide how much money to return to the Banker at the end of the round.

Step 3—Banker's Display Return Promise (DRP)

The Banker is informed of the Game Player's promises (PML from Step 1 and PRS from Step 2).

Step 4—Banker's Actual Loan Selection (ALS)

After receiving the Game Player's Promised Maze Level (PML) and Promised Return Selection (PRS) in Step 3, the Banker then decides how much money to loan to the Game Player for the upcoming round (both the Banker and Game Player began each session with a $50 endowment). The Banker can choose from three loan options:

a. Small ($1-$7)
b. Medium ($4-$10)
c. Large ($7-$13)

After the Banker makes a selection, a dollar value from within the range of the selected loan is randomly selected. The Gamer Player is informed of the dollar amount that the Banker is loaning, but s/he may not have been aware of the category of loan chosen by the Banker due to the overlap in the range of dollars in each category of loan.

Step 5—Game Player's Actual Maze Level (AML)

After receiving the dollar amount of the Banker's loan (but not the loan category), the Game Player then choses the ACTUAL level of difficulty for the maze that s/he will complete. This choice does not have to be the same as what the Game Player initially promised, and the Game Player is aware that the Banker will never be informed of the ACTUAL choice that the Game Player makes. Then, the Game Player has two minutes to complete the virtual maze. The actual maze difficulty selection makes it possible for the Game Player to take larger risks with larger potential earnings, which could allow the Game Player to retain more of the earnings undetected. For example, if the Game Player promises low maze risk (maximum of 50% earnings above the loan) and to return 50% of the gains, but then actually completes a high risk maze and triples the loan amount, then the Game Player can return the original loan plus an additional 50% of the loan value, keeping the additional 150% for himself/herself, with no way for the Banker to know s/he had been misled. As will be explained in Step 7, this type of behavior is scored as returning less than promised, and hence untrustworthy.

Step 6—the Maze Task (Start of Maze (SMZ) and End of Maze (EMZ))

While the Game Player completes the maze, the Banker is given a top-down view of the maze map and is able to watch the Game Player's progress through the maze. However, this top-down view is designed to provide the Banker with only a vague impression of the Game Player's success. The locations of the cash boxes in the maze are not displayed to the Banker, and no additional information about the Game Player's actual maze performance is ever given to the Banker. Therefore, the Banker is generally unaware of how well the Game Player navigates the maze, with the exception of any inferences that can be made about the Game Player's task performance based on watching the Game Player "navigate" the maze map.

Step 7—Game Player's Actual Return Selection (ARS)

After completing the maze, the Game Player learns how his/her performance has affected the Banker's loan. S/he then chooses how to split the loan and the interest earned (which is added to the Game Player's endowment at the end of each round) with the Banker. The Game Player has four options for splitting the money:
 a) More than promised
 b) Exact amount promised
 c) Less than promised
 d) Other amount The Game Player is not obligated to honor the original promise made (the Game Player's Promised Return Selection) to the Banker in Step 2. The scoring of this choice as trustworthy or untrustworthy is described in the Scoring Behavior as an Outcome Metric section.

Step 8—Banker's Display Score Report (DSR)

The Banker is informed of the amount of money the Game Player returned for that round. However, this is the only information that the Banker receives concerning the return amount. The Banker is never told exactly how much money the Game Player won or lost or even what level difficulty the Game Player actually chose. Additionally, the Banker does not receive any information concerning how the Game Player chose to split the loan/interest funds from the round.

Step 9—Post-Round Questionnaire (Begin (PRB) and Submit (PRO))

Last, the Banker and the Game Player each answer questionnaires

These nine steps complete a single round of the task. Each set of five rounds is considered a block, and each set of two blocks is considered a session.

Scoring Behavior as an Outcome Metric

The Game Player's actual return selection decisions are binary coded for purposes of setting up a classic binary classification problem. "Trustworthiness" is defined as the Game Player's decision to return funds as originally promised during the Game Player's Promised Return Selection (Step 2) to the Banker at the end of the round, coded in Actual Return Selection (Step 7). When the returned amount was exactly equal to or greater than the promised amount, this is coded as trustworthiness. When the returned amount was less than the promised amount or the Game Player's earnings were too low to fulfill their promise (i.e. they lost part of the loaned money, unable to fulfill promise), it is coded as untrustworthiness. If no promise was made (i.e. the Game Player chose a Promised Return Selection of 'not listed' or 'decide at end'), the round is discarded. Note that some Game Players may always select a 'no promise' decision.

According to the schema of the Checkmate embodiment, it is assumed that predictions of honesty must be made on a round-by-round basis. In predicting the outcome of a particular round, only data that is available prior to the Game Player's Actual Return Selection for that round can be used. In the Banker's data, the analog event marker for this event is 'DSR' (Display Score Report). All raw data collected prior to the round in question can be used. Unfulfillable promise data is ignored in training the classifier during the training phase.

As noted above, the present invention combines two machine learning techniques, or "Joint Classifiers." In applying this approach to the Checkmate Task, as a "Game Player" and "Banker" progress through a plurality of "Rounds" in a specific "Block" and "Session," increasingly more information is integrated and used to predict the current state. The two Joint Classifiers are generated, utilizing some overlapping and some non-overlapping features. The first classifier, referred to herein as "Joint Classifier 1," provides a majority of the classifications, while the second, referred to herein as "Joint Classifier 2," is used as a leveraging classifier in higher uncertainty situations.

Data Used by Joint Classifier 1
Literal Data:
1. The banker's actual loan selection in $ (from preprocessed)
Banker Questionnaire data:
2. Short Anxiety State Inventory (from preprocessed)
3. Amended Mayer ABI—Ability (from preprocessed)
4. Amended Mayer ABI—Benevolence (from preprocessed)
5. Amended Mayer ABI—Integrity (from preprocessed)
Response Time Data:
6. Mean ECG inter-beat interval (from preprocessed)
7. [Time for Player to promise maze level+time for Player to promise return]/[reference time for Player to promise maze level+reference time for Player to promise return].
   Note: the reference times are the times from Round 1 or 6 for Block 1 or 2 respectively. (from primed raw data)
8. Time for Banker to make actual loan selection/reference time for Banker to make actual loan selection
   Note: the reference times are the times from Round 1 or 6 for Block 1 or 2 respectively. (from primed raw data)
9. Time for Player to make actual return selection/time for Banker to make actual loan selection (from primed raw data)

Data Used by Joint Classifier 2
Data in Common with Joint Classifier 1:
1. Items 2-5, 7-9 same as Joint Classifier 1
Additional Literal Data:
2. Current Session # (from preprocessed)
3. Current Block # (from preprocessed)

Additional Response Time Data:
4. Time for Banker to make actual loan selection/previous time for Banker to make actual loan selection (from primed raw data)
5. Time for Player to make actual return selection/previous time for Banker to make actual loan selection (from primed raw data)
6. Previous time for Banker to read display summary/ current time for Player to make actual return selection (from primed raw data).

Checkmate Training Phase

Each Joint Classifier follows an identical processing stream (aside from the features used) during the training phase:
1. Set to train on 99% of the available training data.
2. Identify groups of data within the same player, block, and session (this is important for the HMM process)
3. Transform data to be class 2 (honest) if 'Exact amount promised' or 'More than promised' and class 1 (dishonest) if 'Less than promised'. Importantly we chose to ignore assigning the 'Promise not fullfillable' to the dishonest class as the cost of potential misclassification and less training data. It is not clear to us that behaviors prior to an unfullfillable promise would resemble dishonesty or that the Player actually intends to be dishonest. In fact, when we classify data as such, performance degrades. Interestingly, if unfullfillable promises are classified as honest, and evaluated as such, performance vastly improves.
4. Supplement our preprocessed features with the time data from the primed raw data. The function getTimeMetadata( ) does this succinctly.
5. Check for a few cases where the timings are still messed up (negative or extreme) and void those cases.
6. Train either a LDA or Adaboost Ensemble Boosting (with LDA baseline) classifier on our data. We didn't find much difference in either, but for robustness we are using Adaboost. Because the data is so biased towards honesty a cost function is defined. False positives are penalized at (1−(dishonest %−honest %)) while false negatives are penalized at (1−(honest %−dishonest %)).
7. Use the classifications in 6 as emissions to train a HMM. From the data, it is clear that the honest/ dishonest cycle is clearly a Markov process. HMM transitions are only considered within the same player, session, and block and are created via our modified MATLAB function hmmestimate_INSTINCT( );
8. Define an augmented transition matrix. In Matlab, for the prediction of Markov chains, it assumes that the initial $0^{th}$ sequence state probabilities are completely collapsed into state 1 (dishonest). We distribute initial $0^{th}$ sequence state probabilities based on the actual distribution of the data for the $2^{nd}$ and $7^{th}$ rounds.

Checkmate Evaluation Phase

Each Joint Classifier follows an identical processing stream (aside from the features used) during the evaluation phase:
1. Identify groups of data within the same block and session (this is important for the HMM process)
2. Supplement our preprocessed features with the time data from the primed raw data. The function getTimeMetadata( ) does this succinctly.
3. Check for a few cases where the timings are still messed up (negative or extreme) and set to cases to the mean values (based on the training data).
4. Using the Adaboost classifier trained previously, make emission predictions based on the features.
5. Make our actual predictions with the HMM. Here we determine how far into a specific session/block we are and use the appropriate amount of data. For example, if we are at Round 2 we can only use Round 2 data to make honest/dishonest predictions. But, if we are at Round 5, we can use data from rounds 2, 3, 4, and 5 to estimate the honest/dishonest state path. Because the Player's behavior follows a Markov process this helps significantly. For the sake of this contest we cannot use future data, but in practical application, an estimate of the entire state path could provide a more accurate prediction and can be generated at the end of each block.
6. Leveraging. Use the prediction based from Joint Classifier 1, unless the confidence is <0.5, in which case use whichever classifier has a higher confidence.

Typical Results of the Checkmate Embodiment

Figure 2A:
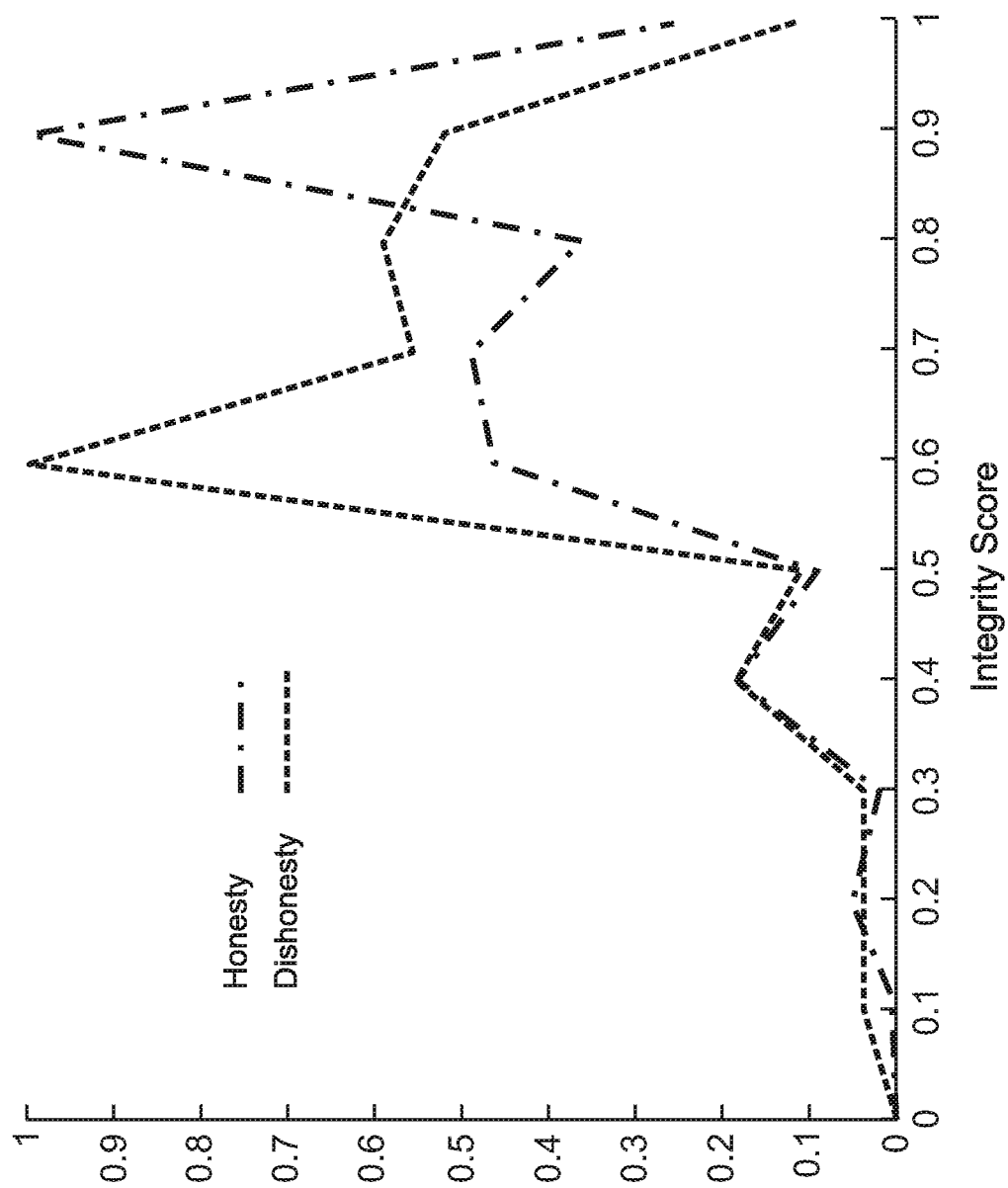
FIG. 2A is graph depicting Amended Mayer ABI—Integrity scores for honesty (alternating dots and dashes) and dishonesty (dashes), as computed from data reported in questionnaires during an application of the Checkmate embodiment of the invention.
Figure 2B:
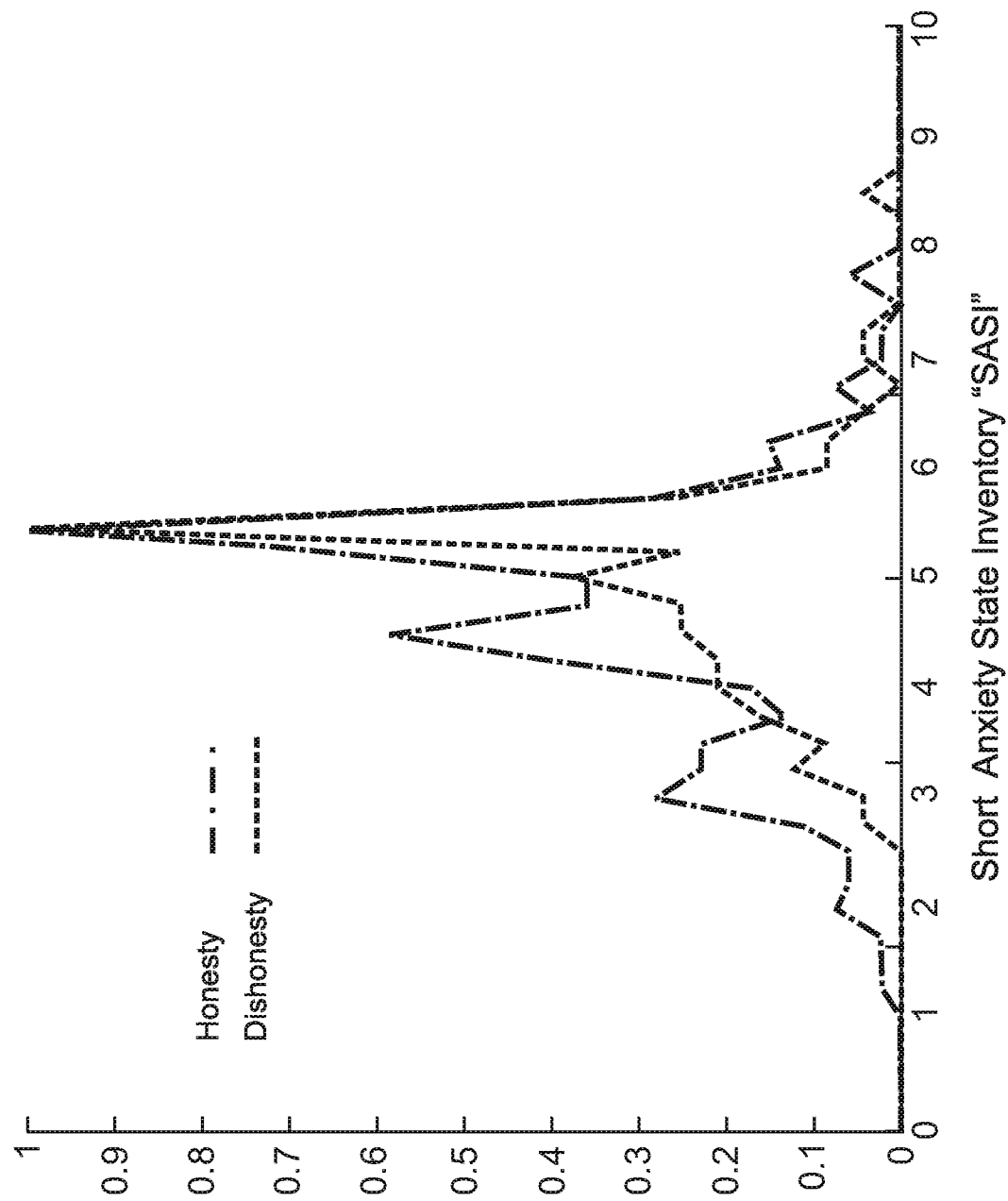
FIG. 2B is a graph depicting Short Anxiety State Inventory ("SASI") for honesty (alternating dots and dashes) and dishonesty (dashes), as computed from data reported in questionnaires during an application of the Checkmate embodiment of the invention.
Figure 2C:
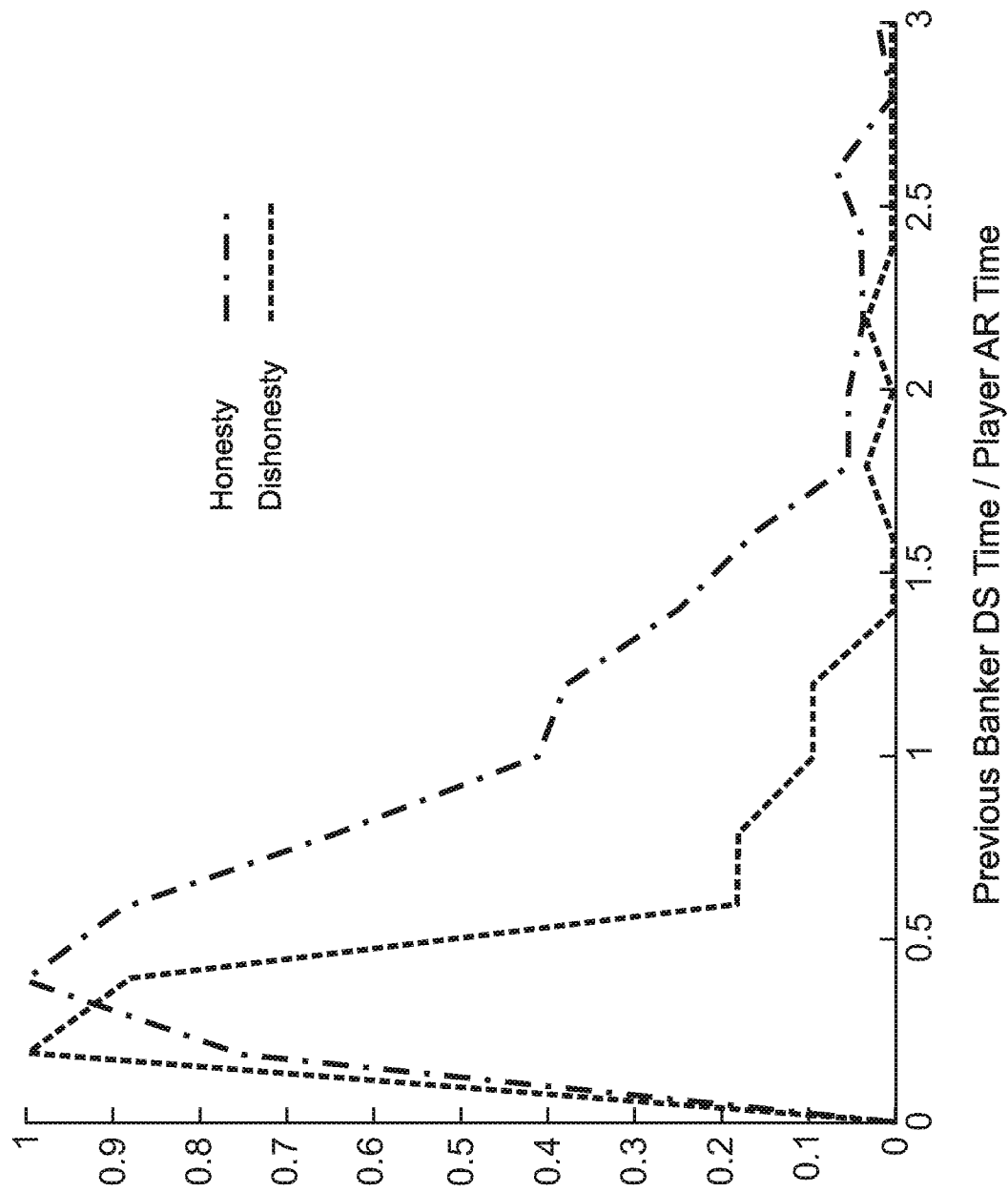
FIG. 2C is a graph depicting Last DS time divided by AR time (previous time for Banker to read display summary divided by current time for Player to make actual return selection) for honesty (alternating dots and dashes) and dishonesty (dashes) as determined using the Checkmate embodiment of the invention.
Figure 2D:
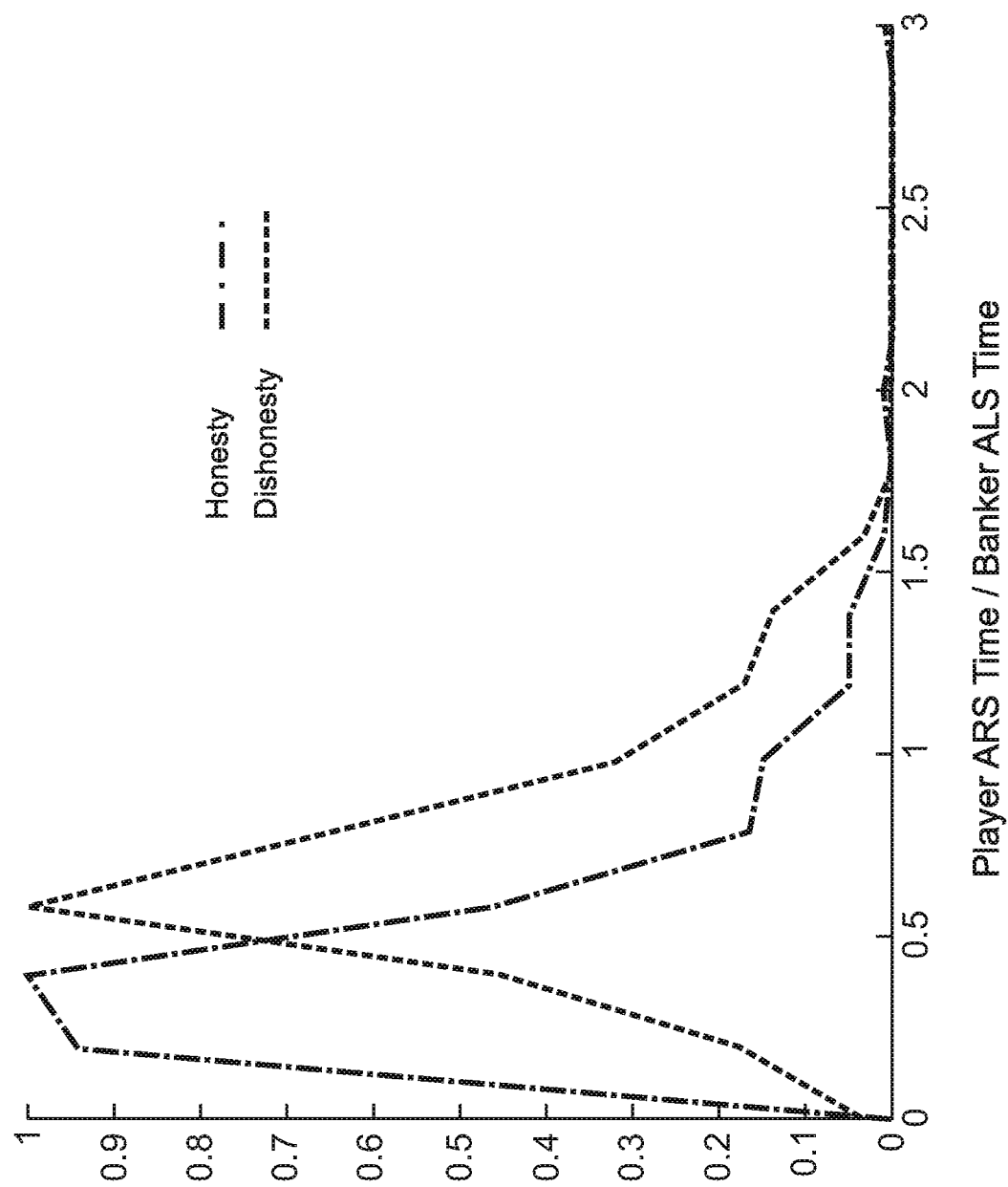
FIG. 2D is a graph depicting ARS time/ALS time (time for Player to make actual return selection divided by time for Banker to make actual loan selection) for honesty (alternating dots and dashes) and dishonesty (dashes) as determined using the Checkmate embodiment of the invention.

The graphs presented in FIGS. 2A-2D present some typical results obtained for honesty (alternating dots and dashes) and dishonesty (dashes) using the Checkmate embodiment as described above. FIG. 2A is graph of Amended Mayer ABI—Integrity scores, FIG. 2B is a graph depicting Short Anxiety State Inventory ("SASI") as computed from data reported in questionnaires, FIG. 2C is a graph depicting Last DS time divided by AR time (previous time for Banker to read display summary divided by current time for Player to make actual return selection), and FIG. 2D is a graph depicting ARS time/ALS time (time for Player to make actual return selection divided by time for Banker to make actual loan selection).

For all of FIGS. 2A-2D the y-axis is a count of the number of data points at each value of the x-axis, similar to a histogram, but plotted as a distribution. All of the values have been normalized by the maximum number of counts for the distribution, so that in each of FIGS. 2A-2D the maximum for each curve is 1.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

This specification is not intended to be exhaustive. Although the present application is shown in a limited number of forms, the scope of the invention is not limited to just these forms, but is amenable to various changes and modifications without departing from the spirit thereof. One or ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

We claim:

1. A method for predicting a trustworthiness of an evaluation subject and taking an appropriate action based thereupon, the method comprising:
during a preparation phase, establishing a schema, said schema comprising:

a plurality of prompts to be provided to a subject by an interviewer during an interview;

a plurality of possible responses receivable from the subject during the interview;

definition of at least one response classifier operable by a computing device; and specification of a plurality of data elements to be obtained during the interview and provided to the at least one response classifier, said data elements being obtainable during the interview without requiring physical access to the subject, said data elements including a decision time of the interviewer and a measurement obtained from a biometric sensor applied to the interviewer;

during a training phase:

applying the schema during a training session to a plurality of test subjects, for whom a truthfulness or falsity of all responses is known; and applying by the computing device of machine learning to data elements obtained from the training session to develop an experience learning database;

during an evaluation phase:

applying the schema to the evaluation subject during an evaluation session;

deriving by the computing device from each of the response classifiers a truthfulness prediction for each response received from the evaluation subject during the evaluation session according to data elements provided to the response classifier from the evaluation session and from the experience learning database; and making a trustworthiness evaluation of the evaluation subject based on the truthfulness predictions of the response classifiers, said truthfulness predictions being based at least in part on the decision time of the interviewer and the measurement obtained from the biometric sensor applied to the interviewer; and taking an appropriate action regarding the evaluation subject based on the trustworthiness evaluation.

2. The method of claim 1, wherein the plurality of possible responses receivable from the subject during the interview according to the schema is not limited to yes and no responses.

3. The method of claim 1, wherein the at least one response classifier includes a Linear Discriminant Analysis (LDA) classifier.

4. The method of claim 1, wherein the plurality of data elements to be obtained during the interview according to the schema includes at least one decision time of the subject.

5. The method of claim 1, wherein the plurality of data elements to be obtained during the interview according to the schema includes at least one trustworthiness impression obtained from the interviewer.

6. The method of claim 5, wherein the trustworthiness impression is obtained from at least one answer provided by the interviewer in response to a questionnaire.

7. The method of claim 1, wherein the evaluation subject is not included among the test subjects.

8. The method of claim 1, wherein the data elements to be obtained from the subject during the interview according to the schema are limited to subject responses and subject response times.

9. The method of claim 1, wherein at least one of the data elements obtained during the evaluation session is used to enhance the experience learning database and thereby to improve truthfulness predictions for subsequent responses received during the evaluation session.

10. The method of claim 1, wherein at least one of the truthfulness predictions made during the evaluation session is used to enhance the experience learning database and thereby to improve truthfulness predictions for subsequent responses received during the evaluation session.

11. The method of claim 1, wherein:

the schema includes a plurality of response classifiers;

the truthfulness predictions of the response classifiers include confidence scores;

one of the response classifiers is designated as the primary response classifier, the other response classifiers being designated as secondary response classifiers; and for each of the responses obtained from the subject, the truthfulness predictions of the secondary response classifiers are considered only if the truthfulness prediction of the primary response classifier has a low confidence score for that response.

12. The method of claim 1, wherein the trustworthiness evaluation includes a trustworthiness score that falls within a range of possible trustworthiness scores.

13. The method of claim 12, wherein the method further comprises, if the trustworthiness score is below a specified threshold score:

providing an opportunity to the subject to provide further responses; and revising the trustworthiness score according to the additional responses.

14. The method of claim 1, wherein the appropriate action includes denying a security clearance to the evaluation subject.

15. The method of claim 1, wherein the appropriate action includes denying employment to the evaluation subject, or terminating employment of the evaluation subject.

16. The method of claim 1, wherein the appropriate action includes consideration of the trustworthiness evaluation in making at least one of a judgement and an award in an adjudication proceeding.

17. The method of claim 1, wherein the appropriate action includes rejecting the subject from a group of candidates to be considered by a user of a dating service.

18. The method of claim 1, wherein the appropriate action includes initiating further investigation relevant to the evaluation subject.

19. The method of claim 1, wherein the at least one response classifier includes a two state (honest and dishonest) Hidden Markov Model (HMM) classifier having a preset bias that a subject will tend to be consistently truthful or deceptive.

20. A system for predicting a trustworthiness of an evaluation subject, the system comprising:

non-transient media disclosing a schema, said schema including:

a plurality of prompts to be provided to a subject by an interviewer during an interview;

a plurality of possible responses receivable from the subject during the interview; and specification of a plurality of data elements to be obtained during the interview and provided to a computing device, said data elements being obtainable during the interview without requiring physical access to the subject, said data elements including a decision time of the interviewer and a measurement obtained from a biometric sensor applied to the interviewer; and instructions recorded on said non-transient media that are readable by the computing device and executable by the computing device so as to cause the computing device to:

develop an experience learning database by applying machine learning to data elements obtained from a training session during which the schema is applied to a plurality of test subjects for whom a truthfulness or falsity of all responses is known;

apply at least one response classifier to responses obtained from an evaluation session during which the schema is applied to the evaluation subject;

derive from each response classifier a truthfulness prediction for each response received from the evaluation subject during the evaluation session according to data elements provided to the classifier from the evaluation session and from the experience learning database, said truthfulness prediction being based, at least in part, on the decision time of the interviewer and the measurement obtained from the biometric sensor applied to the interviewer;

make a trustworthiness evaluation of the evaluation subject based on the truthfulness predictions of the response classifiers; and provide the trustworthiness evaluation to a user.

21. The system of claim 20, further comprising a biometric monitoring apparatus applicable to the interviewer.

22. The system of claim 21, wherein the biometric monitoring apparatus is able to obtain at least one of an ECG, an EEG, an EOG, and a GSR.

* * * * *